(12) United States Patent
Duarte et al.

(10) Patent No.: US 8,358,977 B2
(45) Date of Patent: Jan. 22, 2013

(54) USE OF MOBILE COMPUTING DEVICE SENSORS TO INITIATE A TELEPHONE CALL OR MODIFY TELEPHONE OPERATION

(75) Inventors: Matias Duarte, Sunnyvale, CA (US); Matthew Hornyak, San Francisco, CA (US); Justin Kodama, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 329 days.

(21) Appl. No.: 12/764,954

(22) Filed: Apr. 22, 2010

(65) Prior Publication Data

US 2011/0263241 A1 Oct. 27, 2011

(51) Int. Cl.
*H04B 7/00* (2006.01)
(52) U.S. Cl. ............... 455/41.3; 455/556.1; 455/557
(58) Field of Classification Search ........ 455/90.1–90.2, 455/556.1–556.2, 557, 41.1–41.3
See application file for complete search history.

(56) References Cited

U.S. PATENT DOCUMENTS

| | | | | |
|---|---|---|---|---|
| 5,987,336 | A * | 11/1999 | Sudo et al. ............... | 455/566 |
| 7,747,293 | B2 * | 6/2010 | Sutardja ................... | 455/574 |
| 2008/0140868 | A1 * | 6/2008 | Kalayjian et al. .......... | 710/8 |
| 2009/0215397 | A1 * | 8/2009 | Thorn et al. .............. | 455/41.2 |
| 2009/0244015 | A1 * | 10/2009 | Sengupta et al. ........... | 345/173 |
| 2010/0041431 | A1 | 2/2010 | Kim et al. | |

FOREIGN PATENT DOCUMENTS

| | | |
|---|---|---|
| KR | 2006-0061050 A | 6/2006 |
| KR | 10-0669048 B1 | 1/2007 |
| KR | 2010-0027307 A | 3/2010 |

OTHER PUBLICATIONS

International Search Report, International Application No. PCT/US2011/025101, Date of Mailing: Oct. 18, 2011, pp. 1-2.

* cited by examiner

*Primary Examiner* — Christian Hannon

(57) ABSTRACT

A system and a method are disclosed for initiating a voice communication, such as a telephone call, or modifying an output device used to present audio data. After receiving a destination identifier, such as a telephone number, data from one or more sensors included in the mobile computing device is analyzed. Responsive to the sensor data describing movement in a first direction of a first axis, such as upward motion along a vertical axis, a voice communication is established using the destination identifier. While audio data from the voice communication, or from another source, is presented, data from the sensors is also analyzed. Responsive to the sensor data indicating one or more types of movement or interactions with a surrounding environment, the output device used to present the audio data is modified.

22 Claims, 5 Drawing Sheets

USE OF MOBILE COMPUTING DEVICE SENSORS TO INITIATE A TELEPHONE CALL OR MODIFY TELEPHONE OPERATION

BACKGROUND

1. Field of Art

The disclosure generally relates to the field of mobile computing devices and more particularly to using data captured from sensors included in the mobile computing device to modify a voice call using the mobile computing device.

2. Description of Art

Portable devices, such as smart phones or tablet computers, are increasingly used for various types of communication. For example, a smart phone is used to send and receive e-mail, text messages, instant messages or telephone calls. However, to initiate a telephone call, conventional portable devices require a user to identify a phone number and provide a separate input to establish communication with an identified phone number. For example, after entering the telephone number a user interacts with a "send" button to dial the entered telephone number. Requiring additional input to dial an identified number increases the complexity of user interaction, as a user may think a call is initiated after the phone number is identified and fail to provide the separate input to initiate the call.

Additionally, while participating in an initiated telephone call, users often attempt perform other functions, such as reviewing an e-mail or accessing a web site, where the portable device is moved away from the user's ear. However, moving portable device to perform another function makes it difficult for the user to hear what is said on the telephone call without manually configuring the portable device to operate in a speakerphone mode or to operate using a headset or other audio output device. Similarly, when the portable device is brought proximate to the user's ear, unless the user manually reconfigures the portable device to deactivate a speakerphone mode and operate in an earpiece mode, the telephone call volume is excessive. Because of the additional inputs needed for manual reconfiguration of the portable device, it is difficult to perform additional tasks while maintaining an established a telephone call using conventional portable devices.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
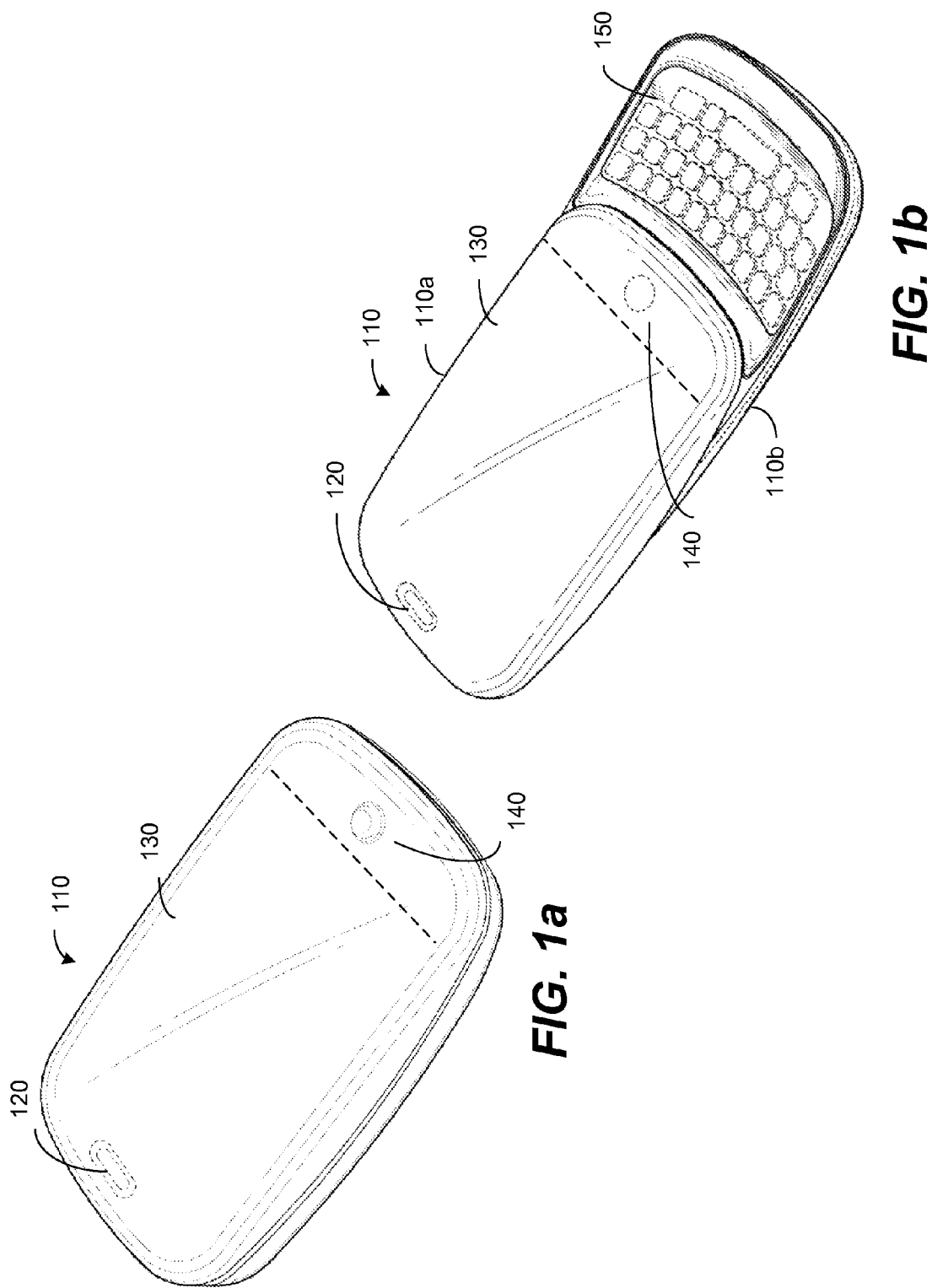
FIG. 1a illustrates one embodiment of a mobile computing device in a first positional state.
FIG. 1b illustrates one embodiment of the mobile computing device in a second positional state.

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will be made in detail to several embodiments, examples of which are illustrated in the accompanying figures. It is noted that wherever practicable similar or like reference numbers may be used in the figures and may indicate similar or like functionality. The Figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium initiates a telephone call, or other voice communication, from a mobile computing device to a destination device associated with a telephone number or other destination identifier. After receiving the destination identifier, data describing the environment external to the mobile computing device or describing the mobile computing device's interaction with the external environment is received from a sensor array included in the mobile computing device. In one embodiment, the sensor array includes an accelerometer, a proximity sensor, a contact sensor and/or a light sensor. Responsive to determining that the sensor array has captured data, or a subset of data, associated with initiation of a voice communication, data is transmitted to the device associated with the telephone number or other destination identifier. For example, responsive to receiving data from the accelerometer indicating that the mobile computing device is moving upward along a vertical axis of the mobile computing device and data from the proximity sensor that the mobile computing device is within a specified distance of a surface, data is transmitted to the device associated with the telephone number or other destination identifier.

In one embodiment, data received from the sensor array while a telephone call, or other voice communication, is ongoing modifies presentation of data received during the telephone call or voice communication. For example, responsive to data from the sensor array indicating movement of the mobile computing device in a second direction, received audio data is presented using a speaker, a headset or another audio output device rather than an earpiece. As an additional example, responsive to data from to receiving data from the accelerometer indicating that the mobile computing device is moving downward along a vertical axis of the mobile computing device and data from the proximity sensor that the mobile computing device is farther than a specified distance from a surface, audio data is presented using a speaker or another audio output device such as a headset. Conversely, responsive to data from to receiving data from the accelerometer indicating that the mobile computing device is moving upward along a vertical axis of the mobile computing device and data from the proximity sensor that the mobile computing device is within a specified distance from a surface while audio data is being presented, a speaker is used to present the audio data.

Example Mobile Computing Device

In one example embodiment, the configuration as disclosed may be configured for use between a mobile computing device, that may be host device, and an accessory device. FIGS. 1a and 1b illustrate one embodiment of a mobile computing device 110. FIG. 1a illustrates one embodiment of a first positional state of the mobile computing device 110 having telephonic functionality, e.g., a mobile phone or smartphone. FIG. 1b illustrates one embodiment of a second positional state of the mobile computing device 110 having telephonic functionality, e.g., a mobile phone, smartphone, netbook, or laptop computer. The mobile computing device 110 is configured to host and execute a phone application for placing and receiving telephone calls.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) and/or data networks having voice over internet protocol (VoIP) functionality. Likewise, the mobile computing device 110 is only by way of example, and the principles of its functionality apply to other computing devices, e.g., desktop computers, server computers and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a personal digital assistant (PDA) or a smart phone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., electrically sensitive (capacitive) or other configuration where the position of an object relative to the screen affects a value) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a dedicated gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACTFLASH, SD CARD, XD CARD, MEMORY STICK, MULTIMEDIA CARD, SDIO, and the like.

Example Mobile Computing Device Architectural Overview

Figure 2:
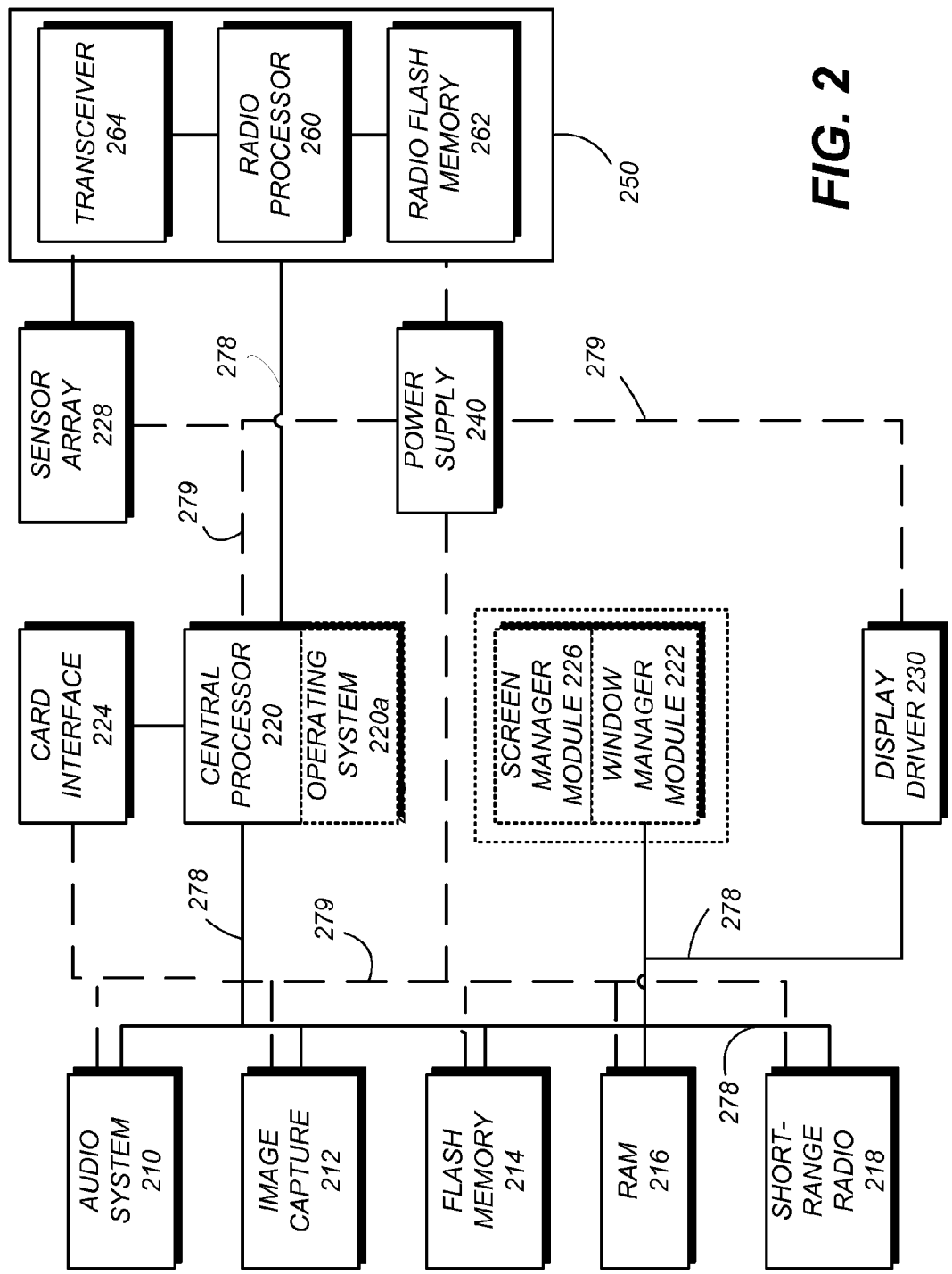
FIG. 2 illustrates one embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIGS. 1a and 1b. The mobile computing device 110 includes a central processor 220, a power supply 240, and a radio subsystem 250. Examples of a central processor 220 include processing chips and system based on architectures such as ARM (including cores made by microprocessor manufacturers), ARM XSCALE, AMD ATHLON, SEMPRON or PHENOM, INTEL XSCALE, CELERON, CORE, PENTIUM or ITANIUM, IBM CELL, POWER ARCHITECTURE, SUN SPARC and the like.

The central processor 220 is configured for operation with a computer operating system. The operating system 220a is an interface between hardware and an application, with which a user typically interfaces. The operating system 220a is responsible for the management and coordination of activities and the sharing of resources of the mobile computing device 110. The operating system 220a provides a host environment for applications that are run on the mobile computing device 110. As a host, one of the purposes of an operating system 220a is to handle the details of the operation of the mobile computing device 110. Examples of an operating system 220a include PALM OS and WEBOS, MICROSOFT WINDOWS (including WINDOWS 7, WINDOWS CE, and WINDOWS MOBILE), SYMBIAN OS, RIM BLACKBERRY OS, APPLE OS (including MAC OS and IPHONE OS), GOOGLE ANDROID, and LINUX.

The central processor 220 communicates with an audio system 210, an image capture subsystem (e.g., camera, video or scanner) 212, flash memory 214, RAM memory 216, and a short range radio module 218 (e.g., Bluetooth, Wireless Fidelity (WiFi) component (e.g., IEEE 802.11)). The central processor communicatively couples these various components or modules through a data line (or bus) 278. The power supply 240 powers the central processor 220, the radio subsystem 250 and a display driver 230 (which may be contact- or inductive-sensitive). The power supply 240 may correspond to a direct current source (e.g., a battery pack, including rechargeable) or an alternating current (AC) source. The power supply 240 powers the various components through a power line (or bus) 279.

The central processor communicates with applications executing within the mobile computing device 110 through the operating system 220a. In addition, intermediary components, for example, a window manager module 222 and a screen manager module 226, provide additional communication channels between the central processor 220 and operating system 220 and system components, for example, the display driver 230.

In one embodiment, the window manager module 222 comprises a software (e.g., integrated with the operating system) or firmware (lower level code that resides is a specific memory for that code and for interfacing with specific hardware, e.g., the processor 220). The window manager module 222 is configured to initialize a virtual display space, which may be stored in the RAM 216 and/or the flash memory 214. The virtual display space includes one or more applications currently being executed by a user and the current status of the executed applications. The window manager module 222 receives requests, from user input or from software or firmware processes, to show a window and determines the initial position of the requested window. Additionally, the window manager module 222 receives commands or instructions to modify a window, such as resizing the window, moving the window or any other command altering the appearance or position of the window, and modifies the window accordingly.

The screen manager module 226 comprises a software (e.g., integrated with the operating system) or firmware. The screen manager module 226 is configured to manage content that will be displayed on the screen 130. In one embodiment, the screen manager module 226 monitors and controls the physical location of data displayed on the screen 130 and which data is displayed on the screen 130. The screen manager module 226 alters or updates the location of data as viewed on the screen 130. The alteration or update is responsive to input from the central processor 220 and display driver 230, which modifies appearances displayed on the screen 130. In one embodiment, the screen manager 226 also is configured to monitor and control screen brightness. In addition, the screen manager 226 is configured to transmit control signals to the central processor 220 to modify power usage of the screen 130.

A sensor array 228 comprises one or more sensors for capturing data describing movement of the mobile computing device 110 throughout an environment or data describing the environment surrounding the mobile computing device 110. For example, the sensor array 228 captures data describing a direction in which the mobile computing device 110 moves throughout an environment. In another embodiment, the sensor array 228 captures data indicating whether the mobile computing device 110 is proximate to an object, such as a user's body or another surface. Additionally, the sensor array 228 may capture data indicating whether the mobile computing device 110 is being held by a user or otherwise contacting a conductive surface, such as a user's hand. One embodiment of a sensor array is further described below in conjunction with FIG. 3. The sensor array 228 receives power from the power supply 240 via the power line (or bus) 279 and communicates data with the central processor 220 and/or the operating system 220a.

By communicating with the central processor 220 and/or the operating system 220a, the sensor array 228 provides data to one or more processes executed by the central processor 220, allowing modification of a process responsive to data from the sensor array 228. In one embodiment, data captured by the sensor array 228 modifies a process transmitting and receiving data via the radio subsystem 250. In one embodiment, data from the sensor array 228 indicating that the mobile computing device 110 moves in a first direction, such as moving upward along a vertical axis, causes the processor 220 to execute a process which transmits a signal to a an identified destination device using the radio subsystem 250. In another embodiment, data from the sensor array 228 indicating that the mobile computing device 110 moves in the first direction, such as upward, or in a second direction, such as downward, along an axis is communicated to the processor 220 to modify operation of a currently executing process. For example, data from the sensor array 228 indicating the mobile computing device 110 moves in the second direction causes data from a voice telephone call to be presented to a user in a speakerphone mode using one or more speakers included in the audio system 210 while data from the sensor array 228 indicating the mobile computing device 110 moves in the first direction causes data from a telephone call to be presented using an earpiece included in the audio system 210. As another example, data from the sensor array 228 indicating the mobile computing device 110 moves in the second direction cause presentation of data from a voice telephone call to be presented to a user through a headset or other audio output device coupled to the mobile computing device 110.

It is noted that in one embodiment, central processor 220 executes logic (e.g., by way of programming, code, or instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through a microphone of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using the data line (or bus) 278.

The card interface 224 is adapted to communicate, wirelessly or wired, with external accessories (or peripherals), for example, media cards inserted into the expansion slot (not shown). The card interface 224 transmits data and/or instructions between the central processor and an accessory, e.g., an expansion card or media card, coupled within the expansion slot. The card interface 224 also transmits control signals from the central processor 220 to the expansion slot to configure the accessory. It is noted that the card interface 224 is described with respect to an expansion card or media card; it also may be structurally configured to couple with other types of external devices for the device 110, for example, an inductive charging station for the power supply 240 or a printing device.

Example Sensor Array Configuration

Figure 3:
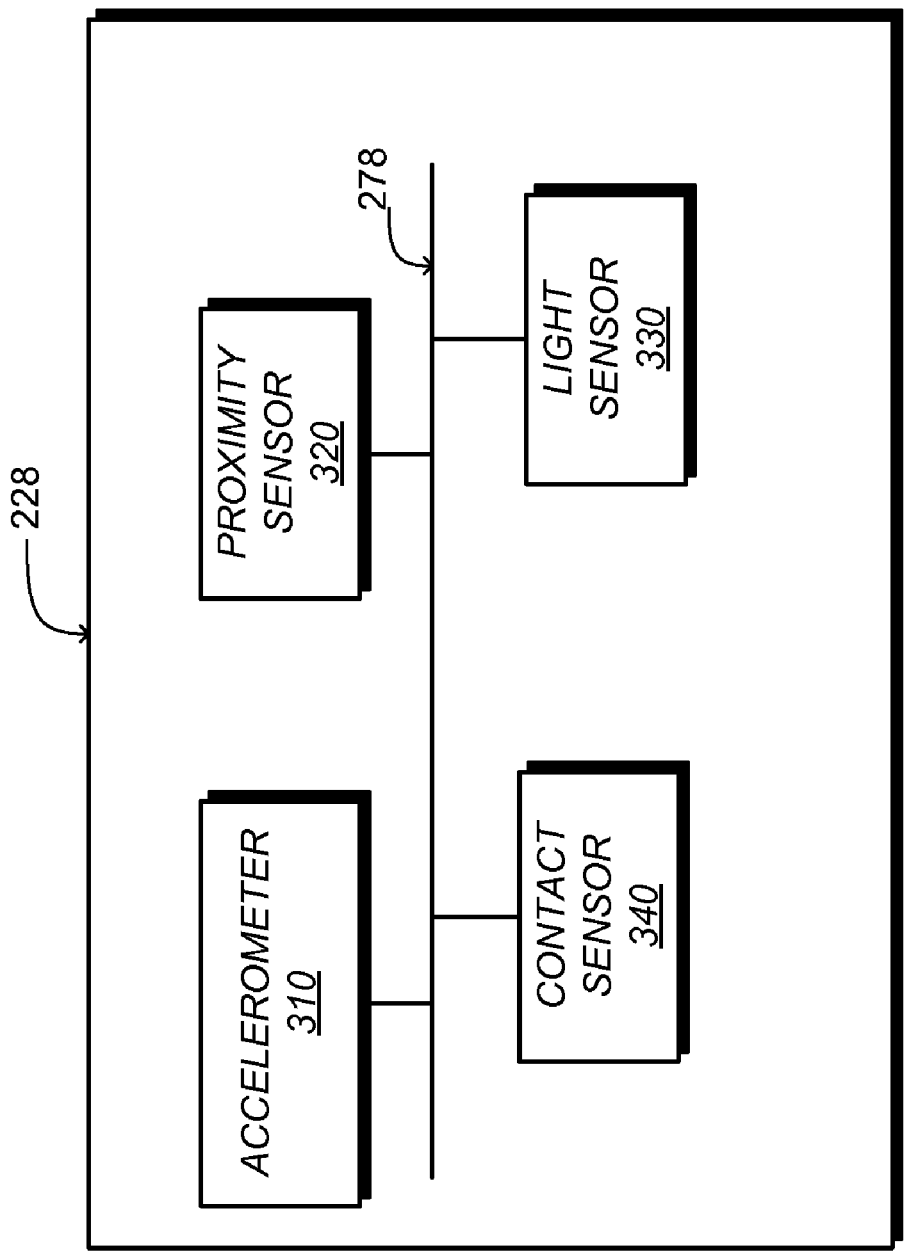
FIG. 3 illustrates a block diagram one embodiment of a sensor array included in a mobile computing device.

FIG. 3 illustrates a block diagram of one embodiment of a sensor array 228 included in a mobile computing device 110. In an embodiment, the sensor array 228 comprises an accelerometer 310, a proximity sensor 320, a contact sensor 330 and a light sensor 340. A data line 278 communicatively couples these components, or modules, to each other and to additional components or modules, such as those described above in conjunction with FIG. 1. One or more of the accelerometer 310, the proximity sensor 320, the light sensor 330 and/or the contact sensor 340 may be deactivated to conserve power, while allowing the sensor array 228 to capture data using the components remaining active. The embodiment shown in FIG. 3 is an example, and in different embodiments, the sensory array 228 includes different and/or additional components than the ones shown in FIG. 3.

The accelerometer 310 captures data describing the orientation or movement of the mobile computing device 110 in one or more dimensions. In one embodiment, the accelerometer 310 also determines the orientation of the mobile computing device 110, such as determining whether the mobile computing device 110 is perpendicular to a first axis or parallel to a first axis. Additionally, the accelerometer 310 captures data describing movement of the mobile computing device 110 along one or more axes of motion. For example, data captured by the accelerometer indicates that the mobile computing device 110 is moving in a first direction or in a second direction along a first axis, such as movement along a vertical axis of the mobile computing device 110.

The proximity sensor 320 determines whether the mobile computing device 110 is proximate to an object, such as a person or other surface. In one embodiment, the proximity sensor 320 comprises a light emitting diode (LED) and a light sensor. Infrared radiation, or other electromagnetic radiation, is transmitted from the LED and the light sensor detects infrared, or other electromagnetic, radiation that is reflected from an entity or surface towards the mobile computing device 110. The light sensor generates a value proportional to the amount of detected radiation, so the value increases as the light sensor detects more radiation. When the mobile computing device 110 is proximate to an entity or surface, the amount of radiation reflected by the entity or surface back towards the computing device 110 increases, increasing the generated value. In one embodiment, the generated value is compared to a threshold and when the generated value equals or exceeds the threshold, the proximity sensor 320 generates a signal indicating that the mobile computing device 110 is within a specified distance of the object or entity. For example, when the value generated by the light sensor generated value equals or exceeds the threshold value, the mobile computing device 110 is within a specified distance of a user's head and the position sensor 320 generates a control signal responsive, as the value indicates that the distance between the mobile computing device 110 and a surface in the external environment is less than or equal to a threshold value.

The light sensor 330 comprises one or more photosensors or photodetectors which generate a voltage, current or other signal proportional to the amount of light, or other electromagnetic energy, detected by the light sensor 330. For example, the light sensor 330 comprises a photovoltaic cell which produces a voltage and/or current proportional to the intensity of light illuminating the light sensor 330 or the light sensor 330 comprises a photoresistor whose resistance changes based on the intensity of light illuminating the light sensor. However, in other embodiments, the light sensor 330 is implemented by any device which produces an output dependent on the intensity of light, or other electromagnetic radiation, which illuminates the light sensor. In one embodiment, the light sensor 330 generates a light control signal responsive to the output equaling or exceeding a threshold value. For example, the light control signal indicates that the mobile computing device 110 is exposed is surrounded by an external environment supplying radiation, such as visible light.

In an embodiment, the sensor array 228 also includes a contact sensor 240 which determines whether the mobile computing device 110 contacts a surface such as a user's hand. For example, the contact sensor 240 comprises a capcitative sensor which detects the proximity of the mobile computing device 110 to an object based on capacitative coupling effects. In one embodiment, the contact sensor 240 comprises an insulating material coated with a conductor, so that when the conductor contacts a conducting surface, such as a user's body, a change in capacitance is detected. In one embodiment, the contact sensor 240 produces a contact control signal responsive to the contact sensor 240 receiving data indicating the mobile computing device contacts a conducting surface, such as responsive to data captured by the contact sensor 240 equaling and/or exceeding a threshold value.

Method for Modifying an Application Responsive to Sensor Array Data

Figure 4:
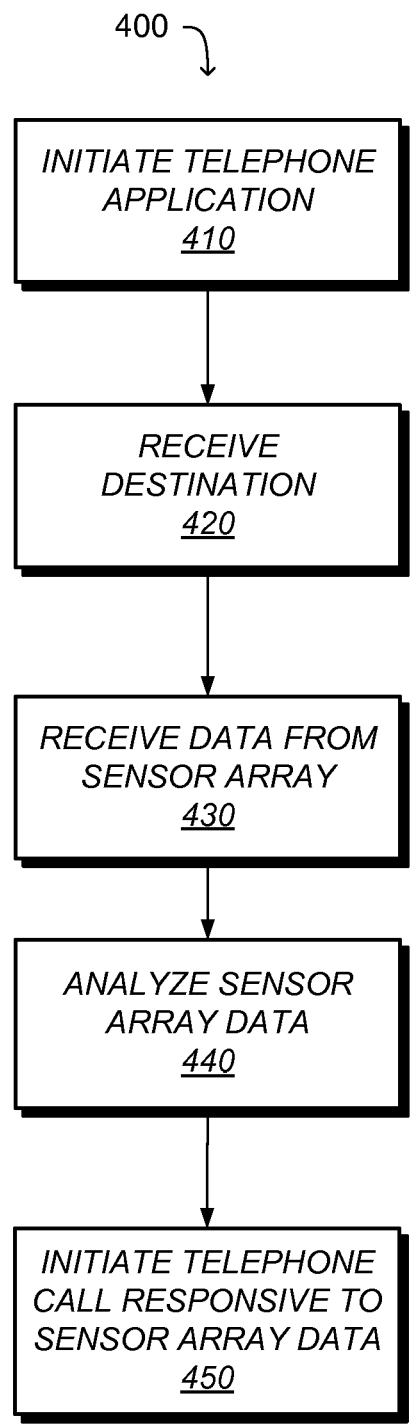
FIG. 4 illustrates one embodiment of a method for initiating a telephone call responsive to data from a sensor array included in a mobile computing device.

FIG. 4 shows an embodiment of a method 400 for initiating a telephone call responsive to data from a sensor array 228 included in a mobile computing device 110. In an embodiment, the steps depicted in the method 400 are implemented by instructions for performing the described actions embodied or stored within a computer readable medium, e.g., flash memory 214 or RAM 216, that are executable by a processor, such as central processor 220. Those of skill in the art will recognize that the method 400 may be implemented in embodiments of hardware and/or software or combinations thereof. Moreover, other embodiments can include different and/or additional steps than the ones shown in FIG. 4. For purposes of illustration, FIG. 4 describes the method 400 for initiating a telephone call responsive to analysis of data from the sensor array 228; however, the method 400 is also applicable to initiating or starting other actions, such as recording audio data using the audio system 210 and/or a microphone.

Initially, a telephone application is initiated 410 and a destination is received 420. For example, a user input selecting a telephone number from an email or from a text message is received which initiates 410 the telephone application and communicates the selected telephone number to the telephone application. As another example, inputs received 420 by the screen 130 or by the keypad 150, are determined, by the central processor 220, to correspond to a telephone number. Accordingly, the central processor 220 initiates 410 the telephone application and communicates the received input to the telephone application. As another embodiment, an entity is selected from a contact database stored in the flash memory 214 and an input associated with the telephone application is received to communicate a telephone number associated with the selected contact to the telephone application.

After the telephone application is initiated 410 and a telephone number, or other destination identifier describing an entity to receive voice data, is received 420, data from the sensor array 228 describing movement of the mobile computing device 110 throughout an environment and/or other data describing the environment external to the mobile computing device 110 is received 420 and analyzed 440. For example, data is received 430 from the accelerometer 310 describing movement of the mobile computing device 110 or data is received 430 from the proximity sensor 320 indicating the distance between the mobile computing device 110 from a surface or from an entity. As additional examples, data is received from the light sensor 330 indicating whether the mobile computing device 110 is being illuminated by light, or electromagnetic radiation, from the surrounding environment or data is received 420 from the contact sensor 340 indicating whether the mobile computing device 110 contacts a conductive entity, such as a user's hand or body. While the above examples describe data from each component included in the sensor array 320, in various embodiments, data is received 430 from a subset of the components included in the sensor array 320. In one embodiment, to conserve power one or more components from the sensor array 228 receive a power-down control from the processor that the one or more components draws from the power from the power supply 240. For example, the accelerometer 310 receives a power-down control signal and is powered-down, so that input is received 430 from the proximity sensor 320, the light sensor 330 and/or the contact sensor 340. In other embodiments, additional components comprising the sensor array 228 are powered-down while data is received 430 from the components of the sensor array 228 continuing to receive power, conserving power to prolong operating time of the mobile computing device 110 while receiving data describing the relationship of the mobile computing device 110 to an external environment.

Data from the sensor array 228 is analyzed 440 to identify a type of movement through the environment external to the mobile computing device 110 or a position of the mobile computing device relative to the environment external to the mobile computing device 110. For example, data from the accelerometer 310 is analyzed 440 to determine a direction in which the mobile computing device 110 moves, such as determining whether the mobile computing device 110 moves in a first direction along a first axis, such as moving upward along a vertical axis. In one embodiment, data from the proximity sensor 320 is compared to a threshold value to determine whether the mobile computing device 110 is within a specified distance of a surface or entity, such as a person. Hence, if the data from the proximity sensor 320 equals or exceeds the threshold value, the mobile computing device 110 is within a specified distance of a surface or entity, such as a user's head. Data from the light sensor 330 is analyzed 440, in one embodiment, to determine whether the mobile computing device 110 is being illuminated from light, or other electromagnetic radiation, from the environment external to the mobile computing device 110. For example, data from the light sensor 330 is compared to a threshold value, and if the data exceeds or equals the threshold value, it is determined that the light sensor 330 is exposed to light from an external environment while if the data is less that the threshold value it is determined that the mobile computing device 110 is within an enclosure, such as a pocket or case. In one embodiment, data from the contact sensor 340 is analyzed 440 to determine whether the mobile computing device 110 contacts a user or another conductive entity. For example, if data from the contact sensor 340 equals or exceeds a threshold, it is determined that the mobile computing device 110 contacts a conductive entity, such as a user, while if data from the contact sensor 340 does is below the threshold, it is determined that the mobile computing device 110 is not contacting a conductive entity.

During analysis 440 of the sensor array, the received data is compared to stored data describing one or more actions or environmental data associated with initiating a telephone call or other communication. For example, the flash memory 214 includes stored data associating telephone call, or voice call, initiation with movement in a first direction along a first axis, such as upward movement along a vertical axis of the mobile computing device 110, followed by the mobile phone 110 being within a predetermined distance of a surface. In an embodiment, initiation of a telephone call is also associated with determining that the mobile computing device 110 contacts a conductive surface, such as a user, and that the mobile computing device 110 is illuminated by light from the environment. In various embodiments, different data is associated with initiating a telephone call, allowing use of data from a subset of the components comprising the sensor array 228. For example, movement in a first direction along a first axis, such as upward movement along a vertical axis of the mobile computing device 110 is also associated with initiating a telephone call.

Responsive to the analysis 440 of the data from the sensor array 228 determining that at least a subset of the received data is associated with stored data for initiating a telephone call, input is provided to the telephone application to initiate 450 a telephone call to the received destination identifier. For example, responsive to determining data from the sensor array 228 indicates motion in a first direction along a first axis, such as upward movement along a vertical axis of the mobile computing device 110, a telephone call is initiated 450 to the destination telephone number. As another example, responsive to determining that data from the sensor array 228 indicates motion in the first direction along the first axis and indicates that the mobile computing device 110 is within a predetermined distance of a surface, a telephone call to the destination identifier is initiated 450. Hence, the method 400 simplifies initiation of a telephone call by initiating the telephone call responsive to movement of the mobile computing device 110 rather than requiring a discrete input to initiate the telephone call. In one embodiment, the telephone call is initiated 450 by establishing a communication channel to a remote device associated with the received telephone number, or destination identifier, using the transceiver 264, so that audio data is transmitted and received by the transceiver 264 via the communication channel.

Figure 5:
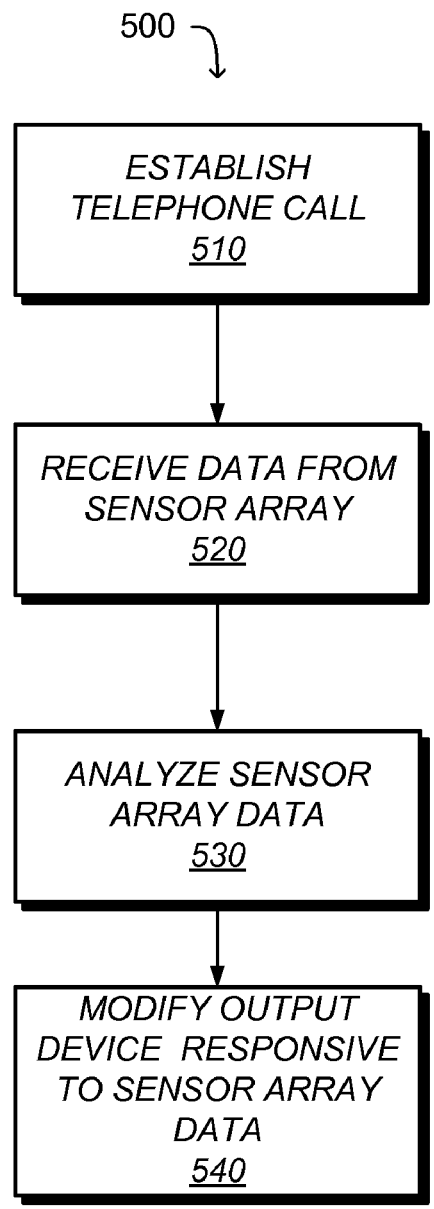
FIG. 5 illustrates one embodiment of a method for modifying operation of an application responsive to data from a sensor array included in a mobile computing device.

FIG. 5 shows an embodiment of a method 500 method for modifying operation of an application responsive to data from a sensor array 228 included in a mobile computing device 110. In an embodiment, the steps depicted in the method 500 are implemented by instructions for performing the described actions embodied or stored within a computer readable medium, e.g., flash memory 214 or RAM 216, that are executable by a processor, such as central processor 220. Those of skill in the art will recognize that the method 500 may be implemented in embodiments of hardware and/or software or combinations thereof. Moreover, other embodiments can include different and/or additional steps than the ones shown in FIG. 5. For purposes of illustration, FIG. 5 describes the method 500 using an example of modifying the output device used to present voice data from a telephone call; however, the method 500 is also applicable modifying operation of other applications, such as audio playback, capturing audio data or other similar actions. Additionally, FIG. 5 describes modifying the output device used to present voice data between an earpiece and one or more speakers; however, in other embodiments, the method 500 may be used to modify whether audio data is presented using a first audio output device or using a second audio output device.

Initially, a telephone call is established 510 so that voice data is received by the mobile computing device 110 and presented to a user via the audio system 210. In an alternative embodiment, rather than establishing a telephone call, audio data is retrieved from a source, such as the flash memory 214 or from an online or remote source and presented to a user. For example, when the telephone call is established 510, or audio data is retrieved, data is presented to the user through an earpiece included in the audio system 210. While the audio data is presented, data describing movement of the mobile computing device 110 throughout an environment and/or other data describing the environment external to the mobile computing device 110 228 is received 520 from the sensor array 228 and analyzed 530. For example, data is received 520 from the accelerometer 310 describing movement of the mobile computing device 110, data is received 520 from the proximity sensor 320 indicating the distance between the mobile computing device 110 from a surface or from an entity. As additional examples, data is received 520 from the light sensor 330 indicating whether the mobile computing device 110 is being illuminated by light or electromagnetic radiation from the surrounding environment and/or data is received 520 from the contact sensor 340 indicating whether the mobile computing device 110 is in contact with the user or other conductive entity. While the above examples describe data from each component included in the sensor array 320, in various embodiments, data is received 520 from a subset of the components included in the sensor array 320, as described above in conjunction with FIG. 4.

Data from the sensor array 228 is analyzed 530 to identify a type of movement through the environment external to the mobile computing device 110 or data describing the environment external to the mobile computing device 110. Data received 520 from the accelerometer 310 is analyzed 530 to determine a direction in which the mobile computing device 110 moves. For example, the received data is analyzed 530 to determine whether the mobile computing device 110 is moving in a first direction along a first axis, such as upward along a vertical axis, or in a second direction along the first axis, such as moving downward along the vertical axis. In one embodiment, data from the proximity sensor 320 is compared to a threshold value to determine whether the mobile computing device 110 is within a specified distance of a surface or entity, such as a person. Hence, if the data from the proximity sensor 320 is below a threshold value, the mobile computing device 110 is farther then a specified distance from a surface or entity, such as within a specified distance of a user's head. Data from the light sensor 330 is analyzed 530, in one embodiment, to determine whether the mobile computing device 110 is being illuminated from light, or other electromagnetic radiation, from the environment external to the mobile computing device 110. For example, analyzing 530 data from the light sensor 330 provides information about whether the mobile computing device 110 is within an enclosure, such as a pocket or case, or exposed to the external environment. In one embodiment, data from the contact sensor 340 is analyzed 530 to determine whether the mobile computing device 110 contacts a user or another conductive entity.

During analysis 530 of the sensor array, the received data is compared to stored data describing one or more actions associated with one or more types of motion or environmental characteristics modification of how data is presented to a user. For example, stored data associates presenting audio data using one or more speakers included in the audio system 210 with movement in a second direction along a first axis, such as downward movement along a vertical axis of the mobile computing device 110 or with the mobile computing device 110 being farther than a predetermined distance from a surface, such as a user's head or ear. As another example, stored data associates presenting audio data using an earpiece or other audio output device coupled to the mobile computing device 110 with movement in a second direction along the first axis, such as downward movement along the vertical axis of the mobile computing device 110. In an embodiment, using speakers, or another audio output device coupled to the mobile computing device 110, to present audio data is also associated with determining that the mobile computing device 110 does not contact a conductive surface, such as a user. In various embodiments, different data is associated with modifying 540 the output device presenting audio data, allowing use of data from a subset of the components comprising the sensor array 228. For example, movement in a second direction along a first axis, such as downward movement along a vertical axis of the mobile computing device 110 while a telephone call is established 510 or while audio data is being presented is associated with modifying 540 the output device presenting the audio data from an earpiece to one or more speakers, or modifying 540 the output device presenting the audio data from an earpiece to a headset coupled to the mobile computing device. Similarly, movement in a first direction along the first axis, such as upward movement along a vertical axis of the mobile computing device 110 while a telephone call is established 510 is associated with modifying 540 the output device presenting the audio data from one or more speakers to an earpiece or from an earpiece or other audio output device coupled to the mobile computing device 110 to the earpiece. Hence, data from the sensor array 228 allows Thus, the disclosed embodiments beneficially allow initiation of a telephone call or voice communication or modification of the presentation of audio data responsive to data from a sensor array 228 identifying movement of the mobile computing device 110 or interaction between the mobile computing device 100 and its surrounding environment. This simplifies initiation of a telephone call or listening to audio data by using data captured during operation of the phone, rather than discrete inputs from a user, to perform actions.

Additional Considerations

Some portions of above description describe the embodiments in terms of algorithms and symbolic representations of operations on information, for example, as illustrated and described, for example, with respect to FIGS. 3, 4 and 5. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for detecting an interaction, such as physical contact, with a screen by calculating the velocity at which an object approaches or moves away from the screen through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A mobile computing device with telephonic functionality comprising:
    an accelerometer for capturing data describing movement of the mobile computing device along one or more axes of motion;
    a proximity sensor for determining a distance between the mobile computing device and a surface in an environment external to the mobile computing device and generating a control signal responsive to the distance equaling a threshold value;
    a processor coupled to the accelerometer and to the proximity sensor;
    a memory including instructions configured to be executed by the processor, the instructions when executed by the processor cause the processor to:
    execute an application for exchanging audio data with a remote device;
    receive a destination identifier identifying the remote device; and
    responsive to receiving data from the accelerometer describing movement of the mobile computing device in a first direction along a first axis of motion and receiving the control signal from the proximity sensor, initiate a telephone call using a telephone application and a communication channel with the remote device associated with the received the destination identifier; and
    a transceiver coupled to the processor for transmitting audio data to the remote device via the communication channel and receiving audio data from the remote device via the communication channel.

2. The mobile computing device of claim 1, further comprising: a contact sensor coupled to the processor, the contact sensor for generating a contact signal responsive to the contact sensor physically contacting a conductive surface; and initiating the communication channel with the remote device is responsive to receiving the contact signal.

3. The mobile computing device of claim 1, further comprising: a light sensor coupled to the processor, the light sensor detecting radiation from the environment external to the mobile computing device and generating a light control signal responsive to the light sensor detecting a threshold amount of radiation; and initiating the communication channel with the remote device is responsive to receiving the light control signal.

4. The mobile computing device of claim 3, the radiation from the environment external to the mobile computing device comprises visible light.

5. The mobile computing device of claim 1, the proximity sensor comprising:

a light emitting diode (LED) for transmitting radiation; and
a radiation sensor for detecting radiation transmitted from the LED and reflected from a surface in the environment external to the mobile computing device and for generating a value proportional to the amount of detected radiation.

6. The mobile computing device of claim 1, further comprising:
an earpiece coupled to the transceiver and to the processor, the earpiece for presenting audio data from the transceiver;
a speaker coupled to the transceiver and to the processor, the speaker for presenting audio data from the transceiver; and
the memory including instructions configured to be executed by the processor, the instructions when executed by the processor cause the processor to:
play audio data received from the communication channel using the earpiece; and
responsive to receiving data from the accelerometer describing movement of the mobile computing device in a second direction along the first axis of motion, play audio data received from the communication channel using the speaker.

7. The mobile computing device of claim 1, wherein the memory further includes instructions configured to be executed by the processor, the instructions when executed by the processor cause the processor to:
transmit a power-down control signal to the proximity sensor, the power-down control signal reducing the power drawn from a power supply by the proximity sensor; and
responsive to receiving data from the accelerometer describing movement of the mobile computing device in the first direction along the first axis of motion and receiving the control signal from the proximity sensor, initiate the communication channel with the remote device.

8. A method for initiating a voice communication on a mobile computing device comprising:
executing, using a processor, instructions for initiating a voice communication to a destination identifier;
receiving a destination identifier;
receiving data from one or more sensors included in the mobile computing device, the one or more sensors for capturing data from an environment external to the mobile computing device, the receiving data from one or more sensors comprises:
receiving motion data from an accelerometer, the motion data describing movement of the mobile computing device along one or more axes, and
receiving proximity data from a proximity sensor, the proximity data describing a distance between the mobile computing device and an entity; and
responsive to determining at least a subset of the data received from the one or more sensors is associated with initiation of a voice communication, initiating a telephone call using a telephone application with a device associated with the destination identifier and transmitting data to the device.

9. The method of claim 8, the receiving data from one or more sensors included in the mobile computing device associated with the type of motion of the mobile computing device comprising:
receiving contact data from a contact sensor, the contact data indicating a contact between the mobile computing device and a conductive surface; and
receiving light data from a light sensor, the light data describing illumination of the mobile computing device by an external radiation source.

10. The method of claim 9, the determining at least the subset of the data received from the one or more sensors is associated with initiation of a voice communication comprising:
determining the motion data describes movement in a first direction along a first axis.

11. The method of claim 10, the determining at least the subset of the data received from the one or more sensors is associated with initiation of a voice communication further comprising:
determining the proximity data equals or exceeds a threshold value.

12. The method of claim 10, the determining at least the subset of the data received from the one or more sensors is associated with initiation of a voice communication further comprising:
determining the contact data equals or exceeds a contact threshold value indicating the contact sensor contacts a conductive surface.

13. The method of claim 10, the determining at least the subset of the data received from the one or more sensors is associated with initiation of a voice communication further comprising:
determining the light data equals or exceeds a threshold value.

14. A method for modifying an audio output device used by a mobile computing device comprising:
receiving data from an accelerometer and one or more sensors included in the mobile computing device, the accelerometer and one or more sensors for capturing data from an environment external to the mobile computing device;
responsive to determining at least a subset of the data received from the accelerometer and one or more sensors is associated with a type of motion of the mobile computing device;
and
responsive to determining at least the subset of data received from the accelerometer and one or more sensors is associated with initiation of a voice communication, initiating a telephone call with a remote device.

15. The method of claim 14, wherein receiving data from an accelerometer and one or more sensors included in the mobile computing device comprises:
receiving motion data from the accelerometer, the motion data describing movement of the mobile computing device along one or more axes;
receiving proximity data from a proximity sensor, the proximity data describing a distance between the mobile computing device and an entity;
receiving contact data from a contact sensor, the contact data indicating a contact between the mobile computing device and a conductive surface; and
receiving light data from a light sensor, the light data describing illumination of the mobile computing device by an external radiation source.

16. The method of claim 15, the determining at least the subset of the data received from the accelerometer and one or more sensors is associated with initiation of a voice communication comprising:
determining the motion data describes movement in a second direction along a first axis.

17. The method of claim 15, the determining at least the subset of the data received from the accelerometer and one or more sensors is associated with initiation of a voice communication further comprising:
determining the proximity data is less than a threshold value.

18. The method of claim 15, the determining at least the subset of the data received from the accelerometer and one or more sensors is associated with initiation of a voice communication further comprising:
  determining the contact data is less than a contact threshold value indicating the contact sensor contacts a conductive surface.

19. The method of claim 15, the determining at least the subset of the data received from the accelerometer and one or more sensors is associated with initiation of a voice communication further comprising:
  determining the light data equals or exceeds a threshold value.

20. The method of claim 14, further comprising:
  responsive to determining at least a subset of the data received from the accelerometer and one or more sensors is associated with a second type of motion of the mobile computing device, presenting audio data using the first audio output device.

21. The method of claim 14, the first audio device comprising an earpiece and the second audio device comprises a speaker.

22. The method of claim 14, the first audio device comprising an earpiece and the second audio device comprises a headset.

* * * * *